United States Patent
Sane et al.

(10) Patent No.: US 10,266,279 B2
(45) Date of Patent: Apr. 23, 2019

(54) SLUNG LOAD IDENTIFICATION WITH AIRCRAFT FLIGHT DYNAMICS DATA

(71) Applicant: Sikorsky Aircraft Corporation, Stratford, CT (US)

(72) Inventors: Harshad S. Sane, Southbury, CT (US); Michael Aaron Connor, Milford, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 88 days.

(21) Appl. No.: 15/509,921

(22) PCT Filed: Sep. 14, 2015

(86) PCT No.: PCT/US2015/049938
§ 371 (c)(1),
(2) Date: Mar. 9, 2017

(87) PCT Pub. No.: WO2016/060763
PCT Pub. Date: Apr. 21, 2016

(65) Prior Publication Data
US 2018/0229855 A1    Aug. 16, 2018

Related U.S. Application Data

(60) Provisional application No. 62/052,623, filed on Sep. 19, 2014.

(51) Int. Cl.
| | | |
|---|---|---|
| *B64D 45/00* | (2006.01) | |
| *B64D 1/22* | (2006.01) | |
| *G05B 17/02* | (2006.01) | |
| *B64C 27/04* | (2006.01) | |

(52) U.S. Cl.
CPC ............ *B64D 45/00* (2013.01); *B64D 1/22* (2013.01); *G05B 17/02* (2013.01); *B64C 27/04* (2013.01)

(58) Field of Classification Search
CPC .......... B64D 45/00; B64D 1/22; G05B 17/02; B64C 27/04
USPC ............................................................ 701/3
See application file for complete search history.

(56) References Cited

U.S. PATENT DOCUMENTS

| | | | |
|---|---|---|---|
| 3,833,189 | A | 9/1974 | Fowler et al. |
| 8,532,846 | B2 | 9/2013 | Tollenaere et al. |
| 8,606,434 | B2 | 12/2013 | Brenner et al. |
| 8,622,336 | B2 | 1/2014 | Brenner et al. |

(Continued)

OTHER PUBLICATIONS

PCT International Search Report and Written Opinion; International Application No. PCT/US2015/049938; International Filing Date: Sep. 14, 2015; dated Mar. 29, 2016; pp. 1-14.

*Primary Examiner* — Marthe Y Marc-Coleman
(74) *Attorney, Agent, or Firm* — Cantor Colburn LLP

(57) ABSTRACT

A system and method for identifying a slung load for an aircraft with one or more sensors includes receiving, with a processor via one or more sensors, sensor information related to flight dynamics data for the aircraft; determining, with the processor, control input commands for the aircraft in response to the receiving of the flight dynamics data; determining, with the processor, signals indicative of an estimated pendulum frequency; and determining, with the processor, parameters associated with the slung load in response to the determining of the estimated pendulum frequencies.

15 Claims, 4 Drawing Sheets

(56) References Cited

U.S. PATENT DOCUMENTS

| | | |
|---|---|---|
| 8,676,405 B2 | 3/2014 | Kubik et al. |
| 2007/0173988 A1* | 7/2007 | Pitt .......................... B64F 5/60 |
| | | 701/10 |
| 2009/0152391 A1 | 6/2009 | McWhirk |
| 2011/0079678 A1 | 4/2011 | Brenner et al. |
| 2011/0084162 A1 | 4/2011 | Goossen et al. |
| 2012/0046810 A1 | 2/2012 | Omar |
| 2012/0136512 A1 | 5/2012 | Kubik et al. |
| 2013/0124177 A1* | 5/2013 | Falangas ................ G05B 17/02 |
| | | 703/8 |

* cited by examiner

SLUNG LOAD IDENTIFICATION WITH AIRCRAFT FLIGHT DYNAMICS DATA

CROSS REFERENCE TO RELATED APPLICATIONS

The present application is a National Stage Application claiming priority to Patent Application PCT/US2015/049938 filed on Sep. 14, 2015, which claims priority to U.S. Provisional Application 62/052,623, filed on Sep. 19, 2014, the contents of which are incorporated herein by reference in their entirety.

FIELD OF THE INVENTION

The subject matter disclosed herein relates to load-management systems in a vertical take-off and landing aircraft, and to a system and a method for using data from aircraft flight system dynamics to identify parameters associated with a slung load in a VTOL aircraft.

DESCRIPTION OF RELATED ART

Typically, a utility VTOL aircraft's ability to carry cargo is one of its most important features. The VTOL aircraft, e.g., a helicopter, can be typically equipped to carry large, long, or oddly shaped cargo on an external sling provided that the cargo is within the lifting capacity of the aircraft. The cargo may often contain sensitive equipment or may be subject to a maximum drop rate or impact force at the time of drop off. The cargo, or equipment contained therein, might not withstand excessive impact associated with gravitational forces. In autonomous cargo applications, such as in unmanned aerial vehicle ("UAV") applications, the cargo is delivered and dropped autonomously by a UAV vertical takeoff and landing ("VTOL") platform. In such a case, the UAV needs to sense various parameters associated with the slung load (i.e., cargo attached by the sling). For example, the UAV needs to sense an event that a slung load is attached, whether the slung load has made contact with the ground or is still in the air in order to perform a safe and controlled detachment operation with respect to the cargo.

Slung loads add load rigid body modes, sling stretching, and load aerodynamics to the system dynamics. The system dynamics includes the aircraft and the load. Management of these slung load parameters has traditionally been approached by additional sling load sensors, camera optical aids, and other sensors. These solutions entail higher cost and multiple points of failure. A system and method that that can utilize system dynamics of a VTOL aircraft with a slung load in order to determine parameters of the slung load is desired.

BRIEF SUMMARY

According to an embodiment of the invention, a method for identifying a slung load for an aircraft includes receiving, with a processor via one or more sensors, sensor information related to flight dynamics data for the aircraft; determining, with the processor, control input commands for the aircraft in response to the receiving of the flight dynamics data; determining, with the processor, signals indicative of an estimated pendulum frequency; and determining, with the processor, parameters associated with the slung load in response to the determining of the estimated pendulum frequencies.

In addition to one or more of the features described above, or as an alternative, further embodiments could include receiving of the sensor information further comprises receiving the flight dynamics data related to at least one of load rigid body modes, sling stretching, and load aerodynamics.

In addition to one or more of the features described above, or as an alternative, further embodiments could include determining a longitudinal pendulum frequency or a lateral pendulum frequency.

In addition to one or more of the features described above, or as an alternative, further embodiments could include determining the estimated pendulum frequency through an online system identification model that includes estimated values of longitudinal and lateral pendulum frequencies, wherein a configuration of the slung load is used to choose the online system identification model.

In addition to one or more of the features described above, or as an alternative, further embodiments could include determining commands associated with pitch and roll of the aircraft.

In addition to one or more of the features described above, or as an alternative, further embodiments could include storing a history of flight dynamics data for the aircraft.

In addition to one or more of the features described above, or as an alternative, further embodiments could include determining a difference in the estimated pendulum frequency from a first time period to a second time period, the second time period being later than the first time period.

In addition to one or more of the features described above, or as an alternative, further embodiments could include determining whether a difference in the estimated pendulum frequency from a first time period to a second time period is above a threshold value, the second time period being later than the first time period.

According to another embodiment of the invention, a system for identifying a slung load for an aircraft includes one or more sensors coupled to the aircraft; a load sling assembly including a sling coupled to an attachment device and a cargo; memory having instructions stored thereon that, when executed by the processor, cause the system to: receive sensor information related to flight dynamics data for the aircraft; determine control input commands for the aircraft in response to the receiving of the flight dynamics data; determine signals indicative of an estimated pendulum frequency; and determine parameters associated with the slung load in response to the determining of the estimated pendulum frequencies.

In addition to one or more of the features described above, or as an alternative, further embodiments could include a processor that is configured to receive the flight dynamics data related to at least one of load rigid body modes, sling stretching, and load aerodynamics.

In addition to one or more of the features described above, or as an alternative, further embodiments could include a processor that is configured to determine a longitudinal pendulum frequency or a lateral pendulum frequency.

In addition to one or more of the features described above, or as an alternative, further embodiments could include a processor that is configured to determine the estimated pendulum frequency through an online system identification model that includes estimated values of longitudinal and lateral pendulum frequencies, wherein a configuration of the slung load is used to choose the online system identification model.

In addition to one or more of the features described above, or as an alternative, further embodiments could include a processor that is configured to determine commands associated with pitch and roll of the aircraft.

In addition to one or more of the features described above, or as an alternative, further embodiments could include a memory that is configured to store a history of flight dynamics data for the aircraft.

In addition to one or more of the features described above, or as an alternative, further embodiments could include a processor that is configured to determine whether a difference in the estimated pendulum frequency from a first time period to a second time period is above a threshold value, the second time period being later than the first time period.

Technical function of the embodiments described above includes determining a change in a slung load including determining whether a slung load is attached to a VTOL aircraft, the mass of the slung load, and whether the slung load is on the ground or in the air using aircraft flight dynamics data.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

Figure 1:
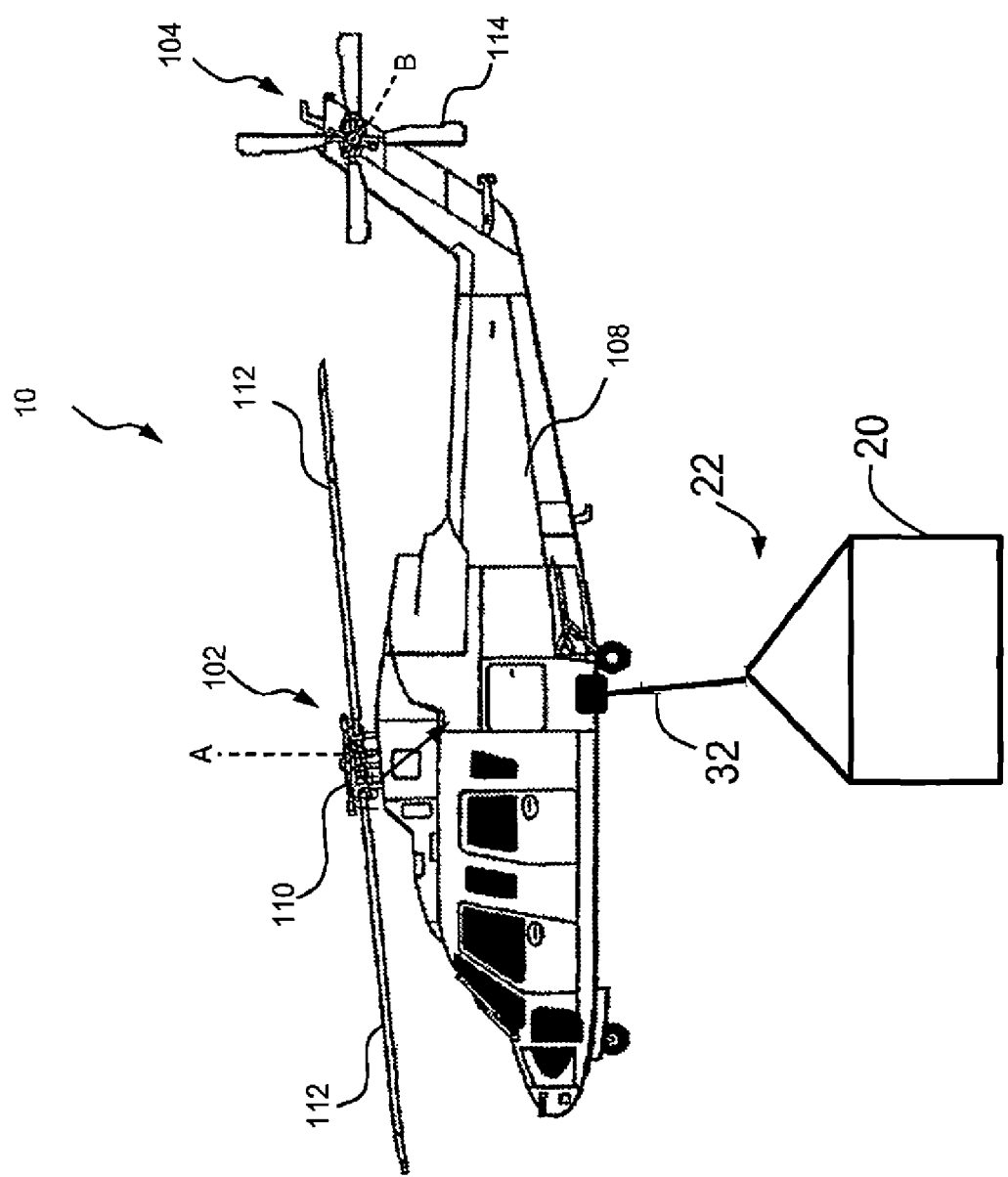
FIG. 1 is a side view of an exemplary VTOL aircraft in accordance with an embodiment of the invention.

FIG. 1 illustrate general views of an exemplary vehicle in the form of a vertical takeoff and landing (VTOL) rotary-wing aircraft 10 according to an embodiment of the invention. In an embodiment, aircraft 10 can be a piloted aircraft or an optionally piloted vehicle that autonomously determines aircraft states during flight. As illustrated in FIG. 1, aircraft 10 includes a main rotor system 102, an anti-torque system, for example, a tail rotor system 104. Main rotor system 102 is attached to an airframe 108 and includes a rotor hub 110 having a plurality of blades 112 that rotate about rotor hub axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines for providing lift and thrust to aircraft. Although a particular configuration of an aircraft 10 is illustrated and described in the disclosed embodiments, it will be appreciated that other configurations and/or machines include autonomous and semi-autonomous aircraft that may operate in land or water including fixed-wing aircraft, dual rotor aircraft and rotary-wing aircraft may also benefit from embodiments disclosed.

Aircraft 10 may be configured to deliver a load or payload, such as cargo 20. Cargo 20 may be coupled to aircraft 10 via a sling assembly 22 (cargo 20 thus attached is hereinafter referred to as "slung load 20"). Sling assembly 22 includes a sling 32 coupled to an attachment device and cargo 20. Sling assembly 22 can contain one or more load sensors for measuring aircraft body states and control deflections. Example load sensors include sensors associated with roll, pitch sensor, roll rate, pitch rate, yaw rate, longitudinal, lateral, and vertical acceleration. In embodiments, aircraft 10 includes algorithms for determining whether slung load 20 is attached to aircraft 10, the mass of slung load 20, and/or whether slung load 20 has made contact with the ground. While a particular counter-rotating, coaxial rotor system aircraft 10 configuration is illustrated in the embodiment of FIG. 1, other rotor systems and other aircraft types such as tilt-wing and tilt-rotor aircrafts may benefit from the present disclosure.

Figure 2A:
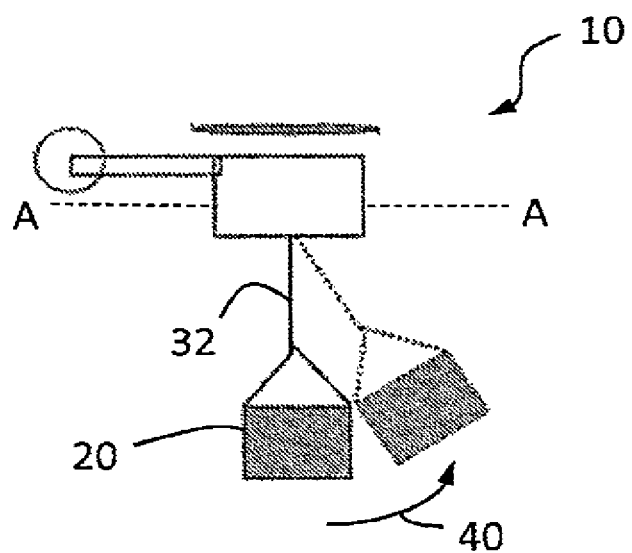
FIG. 2A illustrates a schematic side view of a VTOL aircraft with an aerodynamic instability caused by a slung load in accordance with an embodiment of the invention.
Figure 2B:
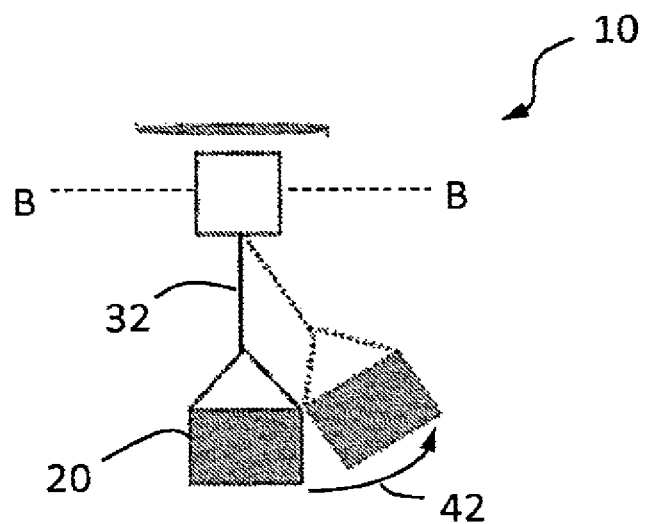
FIG. 2B illustrates a schematic front view of a VTOL aircraft with an aerodynamic instability caused by a slung load in accordance with an embodiment of the invention.

FIGS. 2A and 2B illustrate schematic views of aircraft 10 that depicts exemplary aerodynamic forces acting on slung load 20 in accordance with an embodiment of the invention. Slung load 20 is carried on a single point suspension system (single hook), which only restricts the vertical motion of the slung load 20 with respect to aircraft 10. However, a single sling 32 cannot influence the pitch or yaw motion of slung load 20, and so, both lateral and longitudinal instabilities exist in the form of oscillations in slung load 20. The modes of oscillation can include longitudinal or pitch pendulum mode (depicted in FIG. 2A) and lateral or roll pendulum mode (depicted in FIG. 2B). In a longitudinal pendulum mode, slung load 20 oscillates along direction of arc 40 along longitudinal axis A of aircraft 10 to define a longitudinal pendulum frequency while in a lateral pendulum mode, slung load 20 oscillates along direction of arc 42 along lateral axis B of aircraft 10 to define a lateral pendulum frequency. Only the pendulum modes interact with aircraft 10 in the frequency range of interest. The lateral and longitudinal pendulum frequencies can be estimated from a two-body double-pendulum point-mass approximation of the system according to equation (1).

$$\omega_p = \sqrt{\frac{g}{\ell}\left(1 + \frac{W2}{W1}\right)} \quad (1)$$

Where;
$\omega_p$ = Pendulum frequency in radian/second;
$g$ = Acceleration due to gravity;
$\ell$ = Sling length;
W1 = Aircraft weight; and
W2 = Slung load weight.

Aircraft 10 and slung load 20 oscillate according to the dynamics of a two-body pendulum and, as a result, oscillate at a certain frequency when perturbed. The oscillations are observed as longitudinal and lateral pendulum frequencies. These frequencies can be detected through control inputs in the roll and pitch axes. These control inputs can be used determine a change in the slung load 20 over time, for example, to determine whether a slung load 20 exists and/or whether the slung load 20 is on the ground, as will be described in embodiments with reference to FIG. 4

Figure 3:
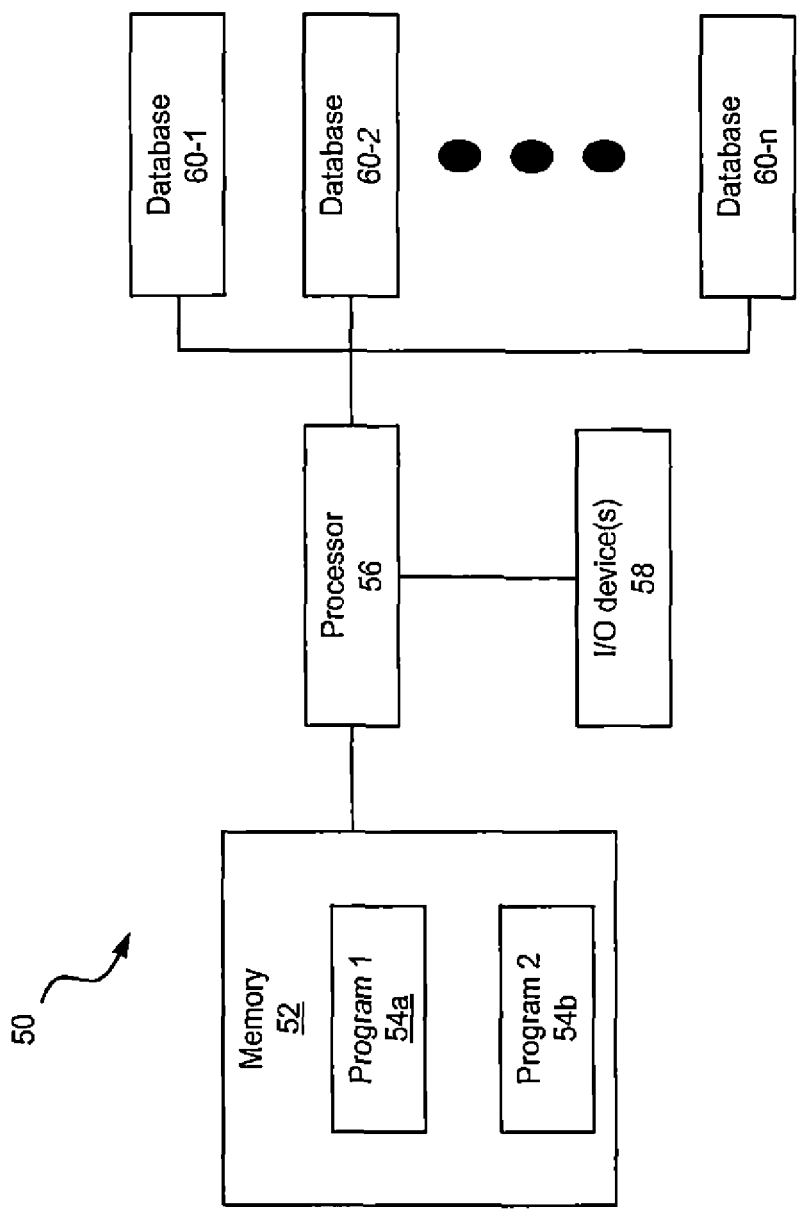
FIG. 3 is a schematic block diagram of a system in accordance with an embodiment of the invention.

FIG. 3 depicts an exemplary computing system 50 that is used for determining a change in a slung load 20 based on monitored aircraft flight dynamics. A change in slung load 20 can include a detached cargo, for example, sling 32 or slung load 20 detaches from aircraft 10, slung load 20 has contacted the ground, or slung load 20 has a reduction in mass, for example, a reduction in mass where one or more contents of slung load 20 have jettisoned from slung load 20 such as, water has been discharged from a payload bucket in a firefighting aircraft. Computing system 50 may be part of a flight control system of aircraft 10 (FIG. 1). Computing system 50 is shown as including a memory 52. Memory 52 may store executable instructions. The executable instructions may be stored or organized in any manner and at any level of abstraction, such as in connection with one or more applications, processes, routines, procedures, methods, etc. As an example, at least a portion of the instructions are shown in FIG. 3 as being associated with a first program 54a and a second program 54b. In an embodiment, first program 54a and second program 54b can be associated with a disturbance rejection algorithm that s associated with a stability augmentation system.

The instructions stored in the memory 52 may be executed by one or more processors, such as a processor 56. Processor 56 may be coupled to one or more input/output (I/O) devices 58. In some embodiments, the I/O device(s) 58 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), a sensor, etc. 110 device(s) 58 may be configured to provide an interface to allow a user to interact with computing system 50.

As shown, processor 56 may be coupled to a number 'n' of databases, 60-1, 60-2, to 60-n. Databases 60-1 to 60-n may be used to store data, such as data obtained from one or more sensors (e.g., accelerometers). In some embodiments, the data may pertain to an aircraft's measured lateral and longitudinal pendulum frequencies for various configurations of pendulum mass and sling. This configuration would be used by system identification to appropriately choose a model of the system to identify pendulum modal frequencies.

Computing system 50 is illustrative. In some embodiments, one or more of the entities may be optional. In some embodiments, additional entities not shown may be included. In some embodiments, the entities may be arranged or organized in a manner different from what is shown in FIG. 3. For example, in some embodiments, memory 52 may be coupled to or combined with one or more of databases 60-1 to 60-n.

Figure 4:
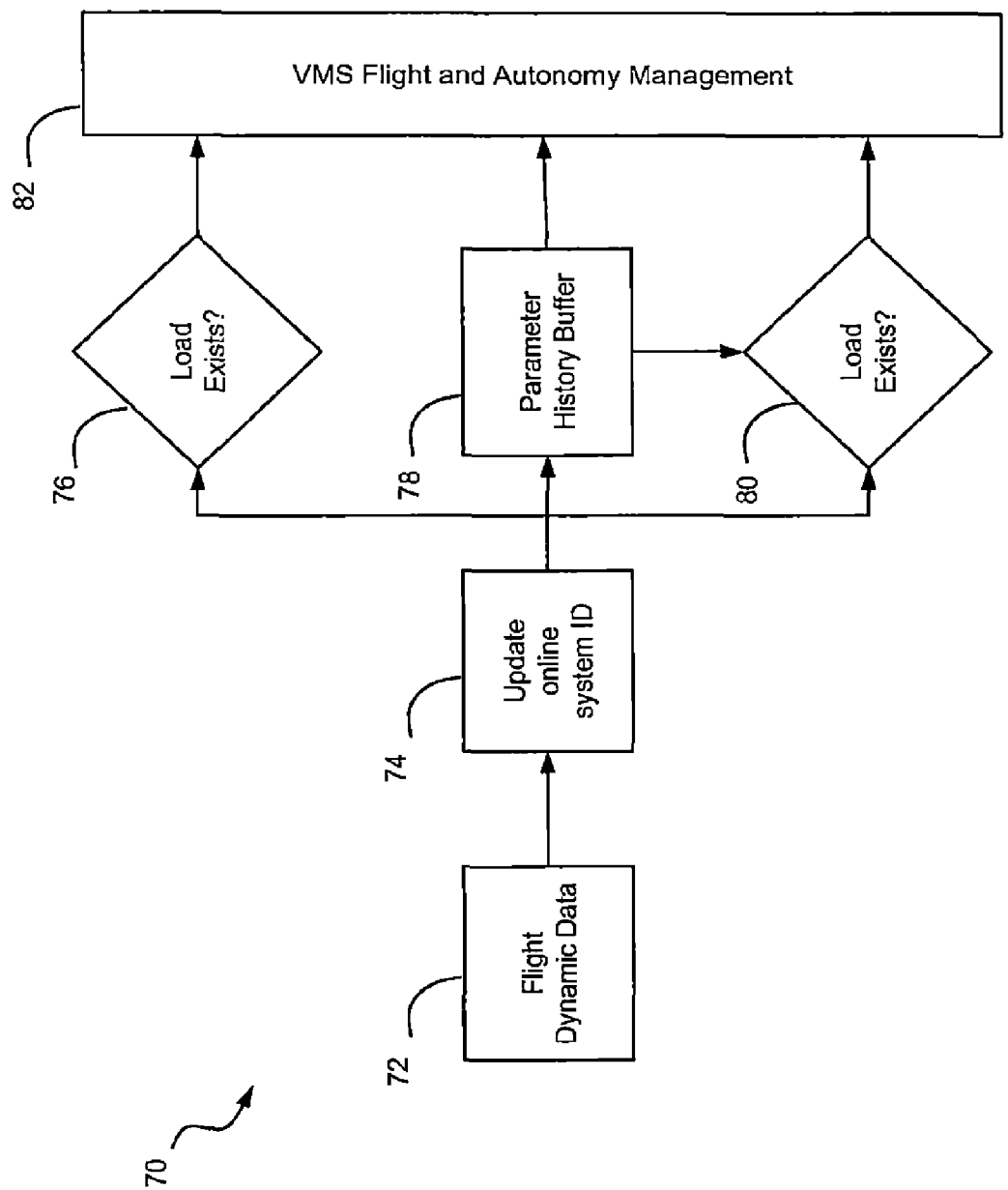
FIG. 4 is a flow chart of a method for identifying a slung load in accordance with an embodiment of the invention.

FIG. 4 depicts an exemplary data flow diagram 70 of a method 70 for determining a change in a slung load 20 in aircraft 10 in accordance with an embodiment of the invention. The method 70 is implemented by computing system 50 of FIG. 3. As such, FIG. 3 is also referenced in the description of data flow diagram 70.

As shown in FIG. 4, flight dynamics data, in 72, can be received by computing system 50 from one or more sensors associated with aircraft 10 (FIG. 1). The dynamics system of aircraft 10 incorporates aircraft 10 and slung load 20. The dynamics system stores data related to load rigid body modes, sling stretching, and load aerodynamics for the slung load 20, as well as aircraft 10 rigid body modes, rotor modes, engine and drive train modes, and structural modes. Computing system 50 continuously monitors the flight dynamics system and determines control inputs associated with roll and pitch commands (i.e., commands for aircraft 10 in the roll and pitch axes). In 74, flight dynamics data is received by an online system identification module in order to determine estimated longitudinal and lateral pendulum frequencies. In an example, computing system 50 includes an online model that contains estimated values of longitudinal and lateral pendulum frequencies for various flight dynamics over time. This model is dependent on the particular aircraft-sling-load configuration and will be used accordingly. The online model is used to evaluate the longitudinal and lateral pendulum frequencies as they change over time. In 76, computing system 50 receives parameters for estimated values of longitudinal and lateral pendulum frequencies and evaluates these in a decision block in order to determine whether there has been a significant reduction in flight dynamics data. In 82, information related to the determination of a change in slung load 20 from 76 is sent to a flight and autonomy management system in order to regulate flight of aircraft 10 and mitigate instabilities from the change in flight dynamics due to a change in slung load 20.

In 78, the online model is received by a parameter history buffer for registration and evaluation. Parameter history buffer, in an example, is a filter averaging buffer that stores a history of flight dynamics data, including longitudinal and/or lateral pendulum frequencies for several time periods and is used to determine a significant change in pendulum frequencies over the several time periods. In 80, computing system 50 determines if the change in value for longitudinal and/or lateral pendulum frequencies is above a determined or measured threshold value. A change above the measured threshold value represents a change in the slung load 20, for example, that the slung load 20 has contacted the ground or has a significant reduction in mass of the slung load 20, such as when the slung load 20 has lost a part of its cargo. In 82, information related to the determination of a change in slung load 20 from block 80 is sent to a flight and autonomy management system in order to regulate flight of aircraft 10 and mitigate instabilities from the change in flight dynamics due to a change in slung load 20.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to propeller blades for aircraft, and can be used in wind turbines and other systems with rotary elements. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for identifying a slung load for an aircraft, comprising:
   receiving, with a processor via one or more sensors, sensor information related to flight dynamics data for the aircraft;
   determining, with the processor, control input commands for the aircraft in response to the receiving of the flight dynamics data;

determining, with the processor, an estimated pendulum frequency of the slung load from the control input commands; and determining, with the processor, a change in the slung load from the estimated pendulum frequencies.

2. The method of claim 1, wherein the receiving of the sensor information further comprises receiving the flight dynamics data related to at least one of load rigid body modes, sling stretching, and load aerodynamics.

3. The method of claim 1, wherein the determining of the estimated pendulum frequency further comprises determining a longitudinal pendulum frequency or a lateral pendulum frequency.

4. The method of claim 1, further comprising determining the estimated pendulum frequency through an online system identification model that includes estimated values of longitudinal and lateral pendulum frequencies, wherein a configuration of the slung load is used to choose the online system identification model.

5. The method of claim 1, wherein the determining of the control input commands further comprises determining commands associated with pitch and roll of the aircraft.

6. The method of claim 1, wherein the determining of the parameters further comprises storing a history of flight dynamics data for the aircraft.

7. The method of claim 6, wherein the determining of the parameters further comprises determining a difference in the estimated pendulum frequency from a first time period to a second time period, the second time period being later than the first time period.

8. The method of claim 6, wherein the determining of the parameters further comprises determining whether a difference in the estimated pendulum frequency from a first time period to a second time period is above a threshold value, the second time period being later than the first time period, to determine a change in a mass of the slung load.

9. A system for identifying a slung load for an aircraft, comprising:

one or more sensors coupled to the aircraft;

a load sling assembly including a sling coupled to an attachment device and a cargo;

memory having instructions stored thereon that, when executed by the processor, cause the system to:

receive sensor information related to flight dynamics data for the aircraft;

determine control input commands for the aircraft in response to the receiving of the flight dynamics data;

determine an estimated pendulum frequency of the slung load from the control input commands; and determine a change in the slung load from the estimated pendulum frequencies.

10. The system of claim 9, wherein the processor is configured to receive the flight dynamics data related to at least one of load rigid body modes, sling stretching, and load aerodynamics.

11. The system of claim 9, wherein the processor is configured to determine a longitudinal pendulum frequency or a lateral pendulum frequency.

12. The system of claim 9, wherein the processor is configured to determine the estimated pendulum frequency through an online system identification model that includes estimated values of longitudinal and lateral pendulum frequencies, wherein a configuration of the slung load is used to choose the online system identification model.

13. The system of claim 9, wherein the processor is configured to determine commands associated with pitch and roll of the aircraft.

14. The system of claim 9, wherein the memory is configured to store a history of flight dynamics data for the aircraft.

15. The system of claim 14, wherein the processor is configured to determine whether a difference in the estimated pendulum frequency from a first time period to a second time period is above a threshold value, the second time period being later than the first time period, to determine a change in a mass of the slung loads.

\* \* \* \* \*